(12) United States Patent
Morita

(10) Patent No.: US 6,498,664 B1
(45) Date of Patent: Dec. 24, 2002

(54) WAVELENGTH DIVISION MULTIPLEXING TRANSMISSION DEVICE AND METHOD HAVING WAVEFORM DISCRIMINATING FUNCTION, AND WAVELENGTH DIVISION MULTIPLEXING TRANSMISSION SYSTEM

(75) Inventor: Hirotaka Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/317,838

(22) Filed: May 25, 1999

(30) Foreign Application Priority Data

Jul. 22, 1998 (JP) ............................................. 10-206780

(51) Int. Cl.$^7$ ............................................... H04J 14/02
(52) U.S. Cl. ........................................ 359/124; 359/133
(58) Field of Search ................................... 359/124, 133, 359/173, 180

(56) References Cited

U.S. PATENT DOCUMENTS 5,938,309 A * 8/1999 Taylor ........................ 359/124

* cited by examiner

*Primary Examiner*—Kinfe-Michael Negash
(74) *Attorney, Agent, or Firm*—Staas & Halsey LLP

(57) ABSTRACT

A wavelength division multiplexing transmission device includes a multiplexer part which multiplexes a plurality of first signals having a first bit rate and different wavelengths into a second signal having a second bit rate higher than the first bit rate and inserts wavelength data information concerning the different wavelengths into the second signal.

22 Claims, 8 Drawing Sheets

FIG.3
PRIOR ART

| No | WAVELENGTH (λ nm) | 4-WAVE MULTIPLEXING | 8-WAVE MULTIPLEXING | 16-WAVE MULTIPLEXING |
|---|---|---|---|---|
| 1 | 1548.51 | ○ | ○ | ○ |
| 2 | 1549.32 | | | ○ |
| 3 | 1550.12 | | ○ | ○ |
| 4 | 1550.92 | | | ○ |
| 5 | 1551.72 | ○ | ○ | ○ |
| 6 | 1552.52 | | | ○ |
| 7 | 1553.33 | | ○ | ○ |
| 8 | 1554.13 | | | ○ |
| 9 | 1554.94 | ○ | ○ | ○ |
| 10 | 1555.75 | | | ○ |
| 11 | 1556.55 | | ○ | ○ |
| 12 | 1557.36 | | | ○ |
| 13 | 1558.17 | ○ | ○ | ○ |
| 14 | 1558.98 | | | ○ |
| 15 | 1559.79 | | ○ | ○ |
| 16 | 1560.61 | | | ○ |

WAVELENGTH DIVISION MULTIPLEXING TRANSMISSION DEVICE AND METHOD HAVING WAVEFORM DISCRIMINATING FUNCTION, AND WAVELENGTH DIVISION MULTIPLEXING TRANSMISSION SYSTEM

BACKGROUND OF THE INVENTION

1. Field of the Invention

The present invention relates to a wavelength discriminating function, and more particularly to a wavelength division multiplexing transmission device and method having a wavelength discriminating function applicable to a wavelength division multiplexing transmission system in an optical communication system.

Recently, there has been considerable activity of increasing communication channels due to an abrupt demand for communications in optical transmission systems. However, an extension work of optical fiber cables needs a huge amount of cost. Hence, a wavelength division multiplexing transmission system is positioned as a key scheme because such a system efficiently utilizes the existing optical fiber cables and can increase the channel capacity by increasing the degree of multiplexing. Nowadays, four-wave multiplexing, eight-wave multiplexing, 16-wave multiplexing and 32-wave multiplexing have been used in practice in the wavelength division multiplexing transmission system.

2. Description of the Related Art

FIG. 1 is a block diagram of a conventional wavelength division multiplexing transmission system (four-wave multiplexing). Line terminal equipment LTE receives four data signals STM-M of a relatively low bit rate and multiplexes the data signals into an optical signal STM-N of a relatively high bit rate having a given wavelength by a method which will be described with reference to FIG. 2.

A line terminal equipment (LTE) 11 multiplexes 1 multiplexes four data signals STM-M#1–#4 of a relatively low bit rate into a single optical signal STM-N of a relatively high bit rate having a wavelength $\lambda 1$ to an optical coupler 15. Similarly, line terminal equipment LTE 12, 13 and 14 respectively output multiplexed optical signals STM-N having wavelengths $\lambda 2$, $\lambda 3$ and $\lambda 4$ and supply them to the optical coupler 15, which has a wavelength multiplexing function (MUX).

The wavelengths $\lambda 1$–$\lambda 4$ are arranged as shown in FIG. 3. As shown in FIG. 3, the wavelengths $\lambda 1$–$\lambda 4$ are respectively set equal to 1548.51 nm, 1551.72 nm, 1554.94 nm and 1558.17 nm. With this arrangement, the wavelength division multiplexing can be realized. Further, 8-wave multiplexing and 16-wave multiplexing can be realized as shown in FIG. 3.

Turning to FIG. 1 again, the optical coupler 15 combines the four high-bit-rate optical signals STM-N having the different wavelengths from the line terminal equipment 11–14, and outputs a combined, namely, multiplexed optical signal to an optical coupler 17 via an optical fiber cable 16.

The optical coupler 17, which has a wavelength demultiplexing function (DMUX), demultiplexes the multiplexed STM-N signal received from the optical fiber cable 15 into four optical signals STM-N having the different wavelengths. Then, the optical coupler 17 outputs the optical signal STM-N of the wavelength $\lambda 1$ to line terminal equipment LTE 18. Similarly, the optical coupler 17 outputs the optical signals STM-N of the wavelengths $\lambda 2$–$\lambda 4$ to line terminal equipment LTE 19–21, respectively.

The line terminal equipment 18 is supplied with the high-bit-rate optical signal STM-N of the wavelength $\lambda 1$ and demultiplexes it into four low-bit-rate data signals STM-M by a method which will be described later with reference to FIG. 2. Similarly, the line terminal equipment 19, 20 and 21 are respectively supplied with the high-bit-rate optical signals STM-N of the wavelengths $\lambda 2$–$\lambda 4$ and demultiplex them into four low-bit-rate data signals STM-M.

The line terminal equipment LTE will be described with reference to FIG. 2, which is a block diagram thereof. The line terminal equipment 11 receives the four low-bit-rate data signals STM-M#1–STM-M#4 from an external device, and outputs these signals to a multiplexer (MUX) 29 via interface parts 25–28, respectively. The multiplexer 29 inserts OHBs (Over Head Bit or Over Head Byte), which are used to transfer maintenance information between communication devices.

A system controller 30 performs various control procedures in accordance with information and data supplied from a local terminal 33 and/or a remote terminal 23 such as a workstation (WS) connected to a network management system (NMS) 22. The remote terminal 23 enables a remote maintenance work.

The multiplexer 29 multiplexes the four data signals STM-M supplied thereto into a single high-bit-rate data signal, and adds OHB data thereto. Then, the multiplexer 29 supplies an electro-optic converter (E/O) 34 with the multiplexed data signal with the OHB data added thereto.

The electro-optic converter 34 converts the received electric signal into a corresponding optical signal. Although not shown in FIG. 2, the optical signal outgoing from the electro-optic converter 34 is supplied to the optical coupler 15 shown in FIG. 1, which coupler multiplexes other optical signals generated similarly. Then, the multiplexed optical signal is output from the optical coupler 15 to the optical coupler 17 via the optical fiber cable 16.

An opto-electric (O/E) converter 36 receives the multiplexed optical signal from the optical fiber cable 16. The converter 36 converts the received optical signal into a corresponding electric signal, which is supplied to a demultiplexer (DMUX) 37. The demultiplexer 37 demultiplexes the received signal into the data signals STM-M#1–STM-M#4 and the OHB data. The data signals STM-M#1–STM-M#4 are respectively supplied to devices of the next stage via interface parts 43–46. The OHB data is supplied to a system controller 38, which performs various controls in accordance with instructions supplied from a local terminal 42 or the aforementioned remote terminal 23.

A description will now be given of a transfer of the maintenance information between the communication devices using the OHB data. The wavelength division multiplexing transmission is used in an SDH (Synchronous Digital Hierarchy) optical communication system which conforms to the international standard of synchronous multiplexing recommended by ITU-T. In the SDH optical communication system, the maintenance information is transferred between the communication devices using the OHB data provided in the STM-N frame which is the unit for multiplexing. The way of using the OHB data is defined.

The minimum management interval between the communication devices in the SDH optical communication system is called "section", and the OHB data for managing the section is called RSOH (Reg. Section Over Head). Conventionally, the RSOH has a section trace function of performing the inter-section management, called J0 byte. The section tracing function using the J0 byte shows from where the signal being transferred comes.

The section trace function will be described with reference to FIG. 4. A station (A) 50 is now located on the transmission side. The optical coupler 15 of the station 50 combines the optical signals respectively having the wavelengths λ1–λ4 generated by the line terminal equipment 11–14, and sends the multiplexed signal to a station (B) 51 located on the reception side. The interval between the stations 50 and 51 is the section, and the section trace function using the J0 byte manages information on the section including the country number, the name of the station and the name of the transmitter device However, in the wavelength division multiplexing transmission system, the J0 bytes of all the wavelength-division-multiplexed signals having different wavelength have the same value because the J0 bytes show from which the respective signals come from (station 50 in the case shown in FIG. 4). Hence, it is impossible to check each of the wavelength-division-multiplexed signals having the different wavelengths by referring to the respective J0 bytes. Conventionally, a spectrum analyzer is used to measure the wavelengths of the wavelength-division-multiplexed signals and check each of them. The above work by the maintenance person is very cumbersome.

In the wavelength division multiplexing transmission system, as an increased number of wavelengths, the adjacent wavelengths become closer to each other. Thus, if a wavelength connection fails, the signals cannot be received correctly or signals other than the target signals may be received. Furthermore, an increased number of wavelengths which are multiplexed and transferred over a single optical fiber needs a more complex management work directed to, for example, getting information on the states of channels.

SUMMARY OF THE INVENTION

It is a general object of the present invention to provide a wavelength division multiplexing transmission device and method and a wavelength division multiplexing system, in which the above disadvantages are eliminated.

A more specific object of the present invention is to provide a wavelength division multiplexing transmission device, method and system in which each of wavelengths multiplexed and transferred over an optical fiber in the wavelength division multiplexing system can be checked and the wavelength management can be facilitated.

The above objects of the present invention are achieved by a wavelength division multiplexing transmission device comprising: a multiplexer part which multiplexes a plurality of first signals having a first bit rate and different wavelengths into a second signal having a second bit rate higher than the first bit rate and inserts wavelength data information concerning the different wavelengths into the second signal. With the above structure, it is possible to notify a remote device of information indicative of the wavelengths included in the second signal.

The above objects of the present invention are also achieved by a wavelength division multiplexing transmission device comprising: a plurality of multiplexer parts, each of which multiplexes a plurality of first signals having a first bit rate and different wavelengths into a second signal having a second bit rate higher than the first bit rate and inserts wavelength data information concerning the different wavelengths into the second signal; and an optical coupler which combines second signals from the plurality of multiplexer parts and outputs a resultant optical signal.

The above objects of the present invention are also achieved by a wavelength division multiplexing transmission device comprising: a demultiplexer part which demultiplexes a second signal having a second bit rate into first signals having a first bit rate lower than the second bit rate and having different wavelengths and wavelength value data concerning the different wavelengths. With the above structure, it is possible to recognize, on a reception side, which wavelengths are included in the second signal.

The above-mentioned objects of the present invention are achieved by a wavelength division multiplexing transmission device comprising: an optical coupler which separates an optical signal transferred over an optical fiber cable into second signals; and a plurality of demultiplexer parts, each of which demultiplexes one of the second signals having a second bit rate into first signals having a first bit rate lower than the second bit rate and having different wavelengths and wavelength value data concerning the different wavelengths.

The above-mentioned objects of the present invention are also achieved by a wavelength division multiplexing transmission system comprising: a first wavelength division multiplexing transmission device; a second wavelength division multiplexing transmission device; and an optical fiber cable. The first and second wavelength division multiplexing transmission devices are configured as described above.

The above-mentioned objects of the present invention are also achieved by a wavelength division multiplexing transmission method comprising the steps of: multiplexing a plurality of first signals having a first bit rate and different wavelengths into a second signal having a second bit rate higher than the first bit rate; and inserting wavelength data information concerning the different wavelengths into the second signal.

The above-mentioned objects of the present invention are also achieved by a wavelength division multiplexing transmission method comprising the steps of: receiving a second signal; and demultiplexing a second signal having a second bit rate into first signals having a first bit rate lower than the second bit rate and having different wavelengths and wavelength value data concerning the different wavelengths.

BRIEF DESCRIPTION OF THE DRAWINGS

Other objects, features and advantages of the present invention will become more apparent from the following detailed description when read in conjunction with the accompanying drawings, in which:

FIG. 3 is a diagram showing a table of an arrangement of wavelengths in the wavelength division multiplexing transmission system;

DESCRIPTION OF THE PREFERRED EMBODIMENTS

A description will now be given of an embodiment of the present invention related to a wavelength division multiplexing transmission device and method and a wavelength division multiplexing transmission device having a wavelength discriminating function.

Figure 5:
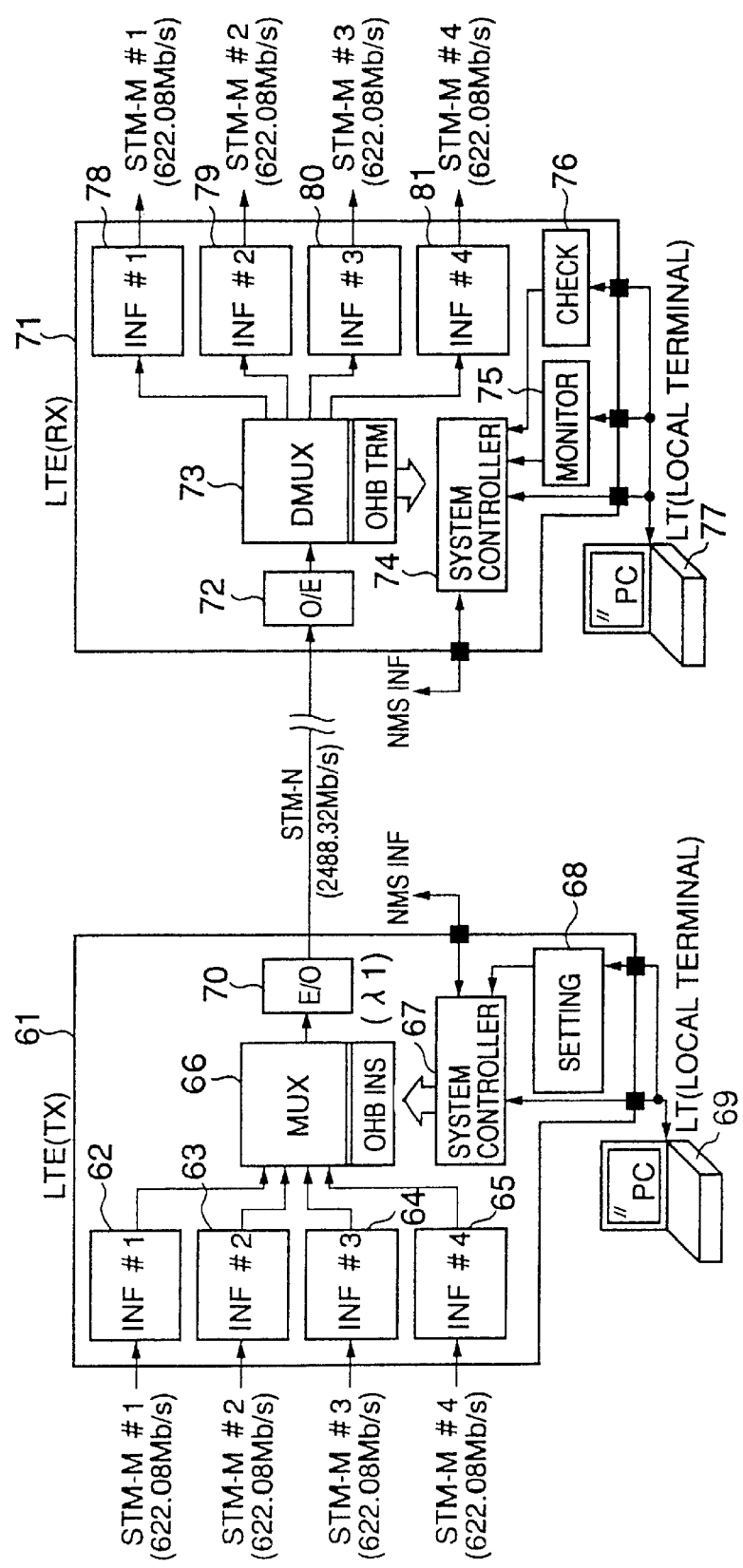
FIG. 5 is a diagram of a line terminal equipment according to an embodiment of the present invention.

FIG. 5 is a block diagram of line terminal equipment LTE having a wavelength discriminating function according to an embodiment of the present invention. A line terminal equipment 61 receives four data signals STM-M#1–STM-M#4 of a relatively low bit rate from an outside thereof, and sends these signals to a multiplexer (MUX) 66 via interface parts 62–65, respectively. In addition to the above signals, the multiplexer 66 is supplied with OHB data for transferring maintenance information between communication devices. In the present invention, wavelength value data indicative of the wavelengths transferred in the wavelength division multiplexing.

A description will now be given of a method of inserting the wavelength value data into the OHB data supplied from a system controller 67 to the multiplexer 66.

Figure 6A:
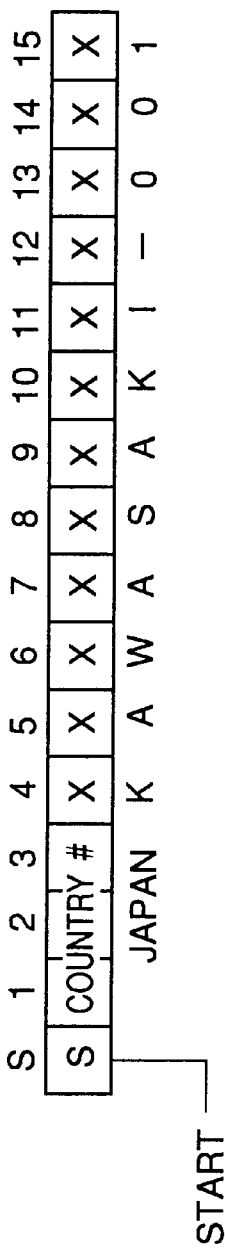
FIGS. 6A and 6B are diagrams of an arrangement in which wavelength value data is inserted into a section trace.
Figure 6B:
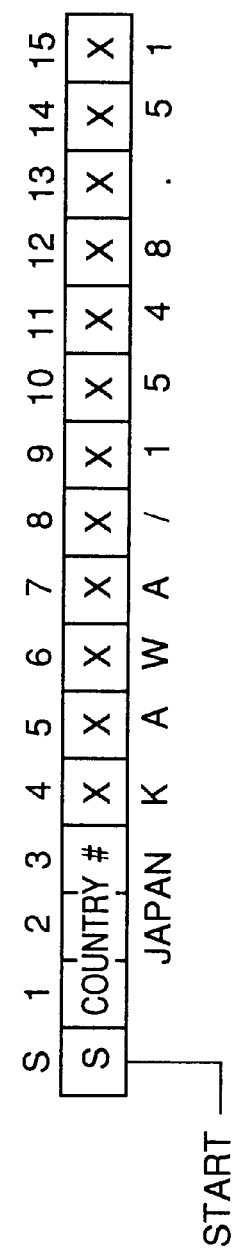

FIGS. 6A and 6B show byte arrangements in which the wavelength value data is inserted into the section trace (J0 byte). More particularly, FIG. 6A shows a byte arrangement in which the wavelength value data is not inserted into the section trace, and FIG. 6B shows a byte arrangement in which the wavelength value data is inserted into the section trace.

The section trace (J0 byte) transfers an S-APIs (Section Access Point Identifier) in order to discriminate a mutual connection between the transmission-side device and the reception-side device. As is known, there are two types of the section access point identifier. By way of example, a description will be given of a case where the wavelength value data is inserted into continuous transmission of a message formed of a 16-byte frame.

As shown in FIGS. 6A and 6B, when the start identifier consists of one byte and the country number consists of three bytes, the arrangement shown in FIG. 6A utilizes 12 bytes for section discrimination. The arrangement shown in FIG. 6B uses 7 bytes for the wavelength value data, and is allowed to use only 4 bytes for section discrimination. Hence, the original information to be sent using the section trace (J0 byte) is restricted by inserting the wavelength value data and a problem may occur.

With the above in mind, the present embodiment employs another way to transfer the wavelength value data.

Figure 7:
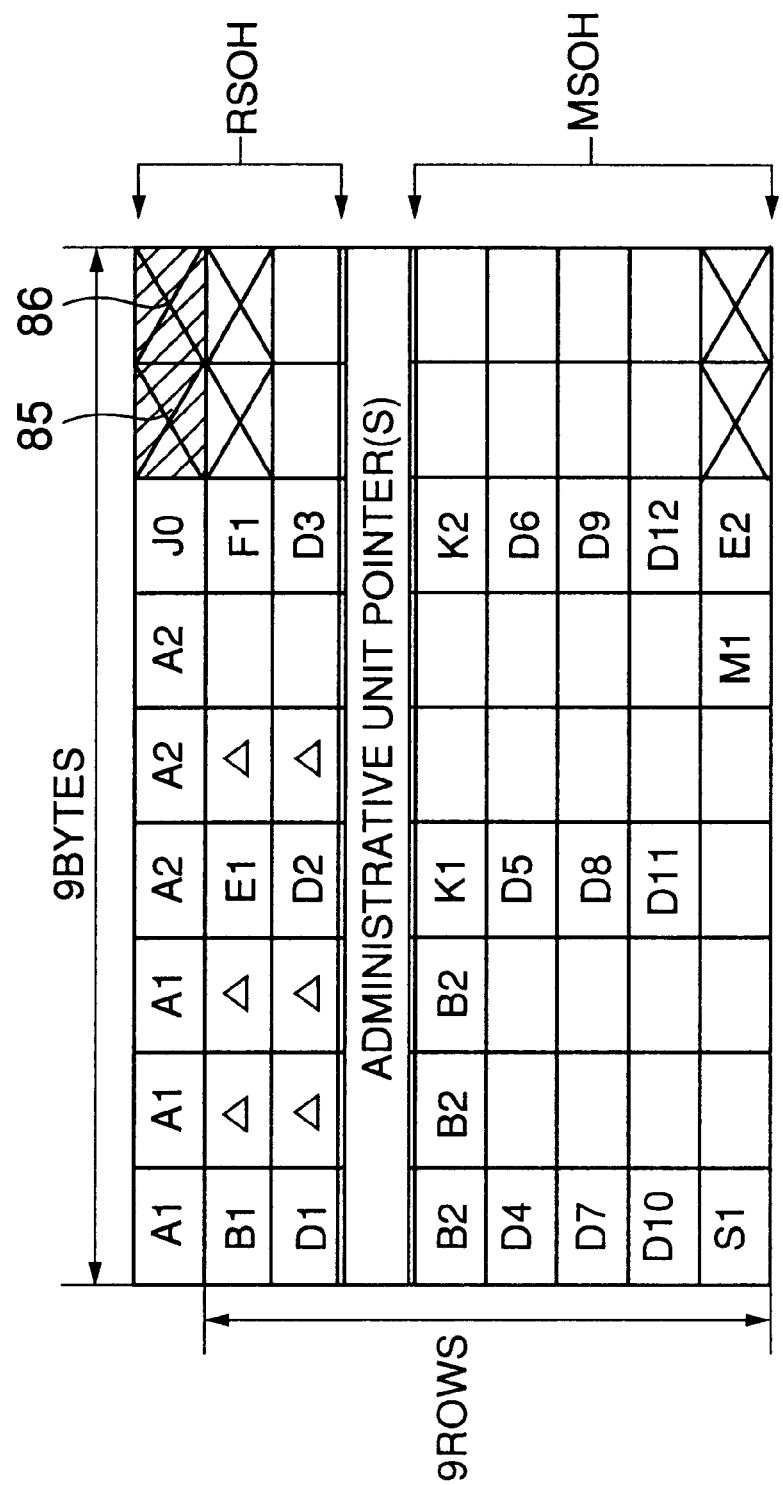
FIG. 7 is a diagram of a section overhead (SOH) of STM-1 frame structure.

FIG. 7 shows an example of the OHB data. As shown in FIG. 7, the OHB data consists of 9 bytes×9 columns, and includes undefined (unused) bytes indicated by "x". The wavelength value data is inserted into undefined bytes. In the following description, the wavelength value data is inserted into two undefined bytes 85 and 86 next to the J0 byte.

Figure 8A:
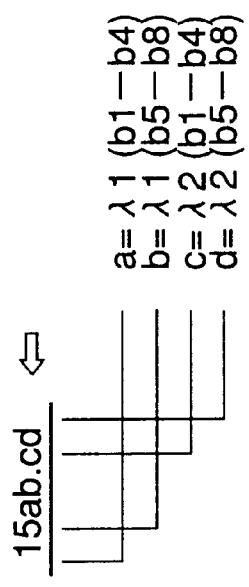
FIGS. 8A and 8B are diagrams of an arrangement in which the wavelength value data is inserted into the section overhead.
Figure 8B:
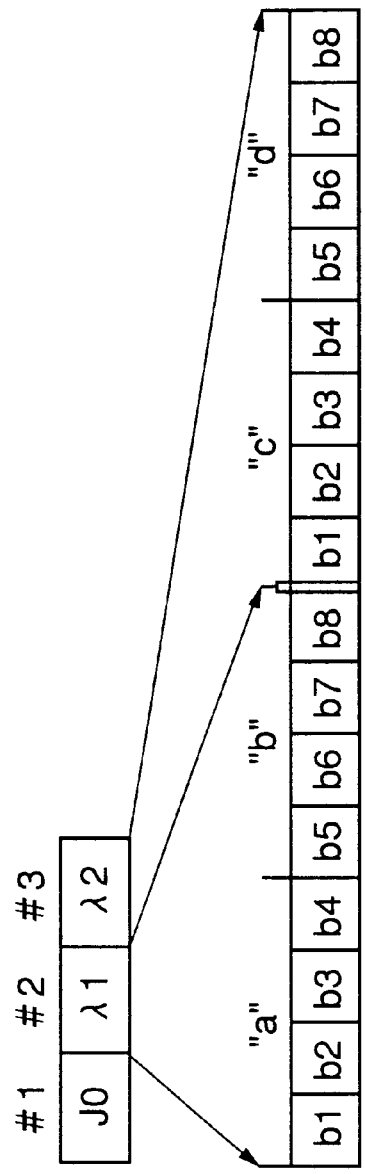

FIG. 8 shows a method of inserting the wavelength value data into the two undefined bytes 85 and 86. More particularly, FIG. 8A shows a method of encoding the wavelength value data, and FIG. 8B shows a bit arrangement in which the encoded wavelength value data is inserted in the OHB data. A case will be considered where a signal source for wavelength division multiplexing is a laser source of the 1.55 $\mu$m band. The values of the wavelengths can be discriminated from each other by the four lower digits thereof. When the four lower digits (any of 0–9) are respectively denoted as a, b, c and d, the wavelength value data can be represented as follows:

$$\lambda n = 15ab.cd \text{ (nm)} \tag{1}$$

When the four lower digits are expressed in binary notation, each of the digits can be expressed by four bits, and the four lower digits can be expressed by 16 bits. As shown in FIG. 8B, the encoded wavelength value data a and b are inserted into byte #2 corresponding to the undefined byte 85, and the encoded wavelength value data c and d are inserted into byte #3 corresponding to the undefined byte 86. In the above manner, the wavelength value data is inserted into the OHB data.

Turning to FIG. 5 again, the wavelength value data is supplied to a transmission-side wavelength value setting part 68 from the local terminal 69. The transmission-side wavelength value setting part 68 encodes the wavelength value data as described above, and supplies the encoded wavelength value data to the system controller 67. The system controller 67 supplies the OHB data including the wavelength value data to the multiplexer 66. The system controller 67 performs various controls in accordance with the instructions from the local terminal 69.

The multiplexer 66 multiplexes the four low-bit-rate data signals STM-M#1 - STM-M#4 into a high-bit-rate data signal, and adds the OHB data thereto. Then, the multiplexer 66 supplies the high-bit-rate data signal with the OHB data added thereto to an electro-optic converter 70.

Figure 1:
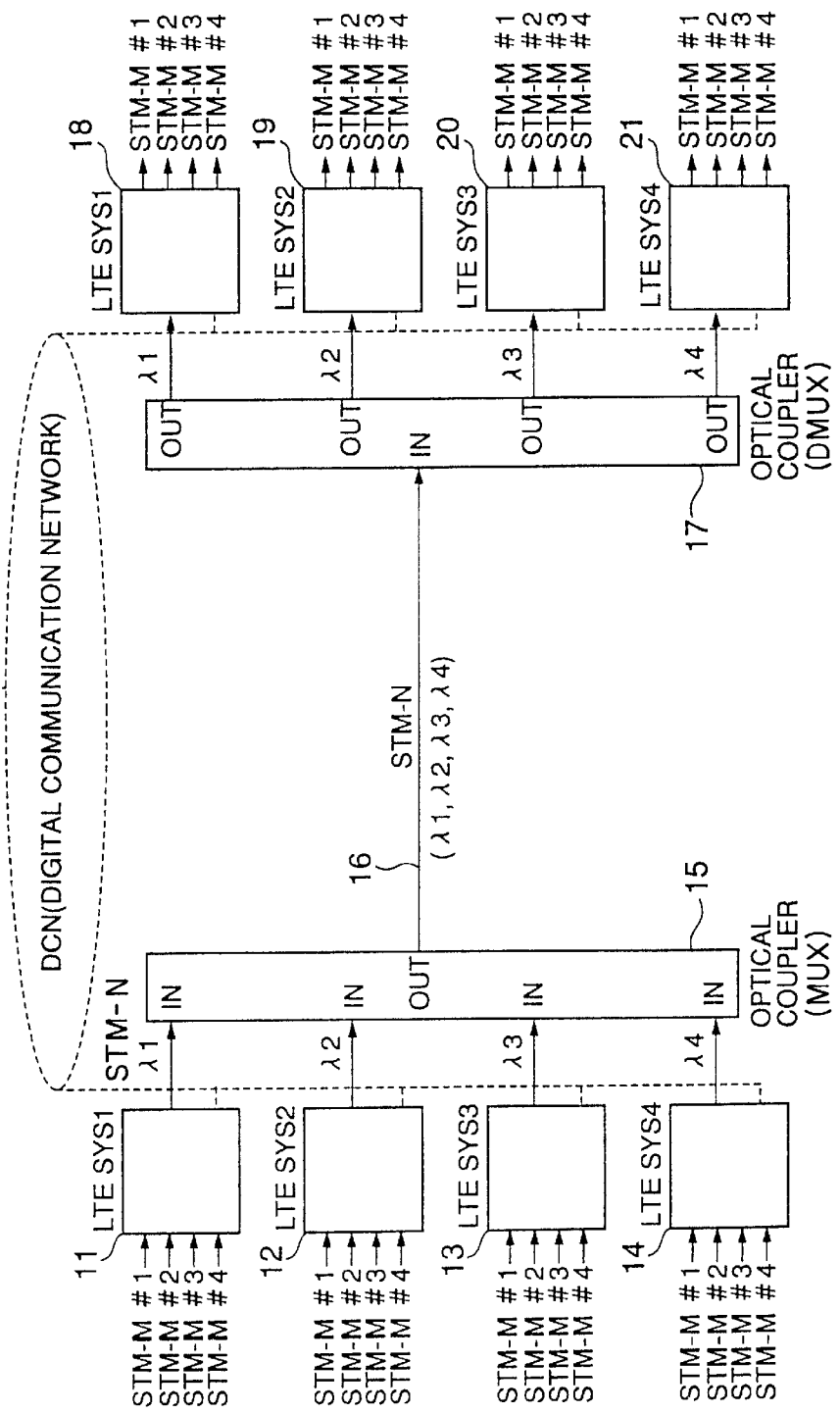
FIG. 1 is a block diagram of a conventional wavelength division multiplexing transmission system.
Figure 2:
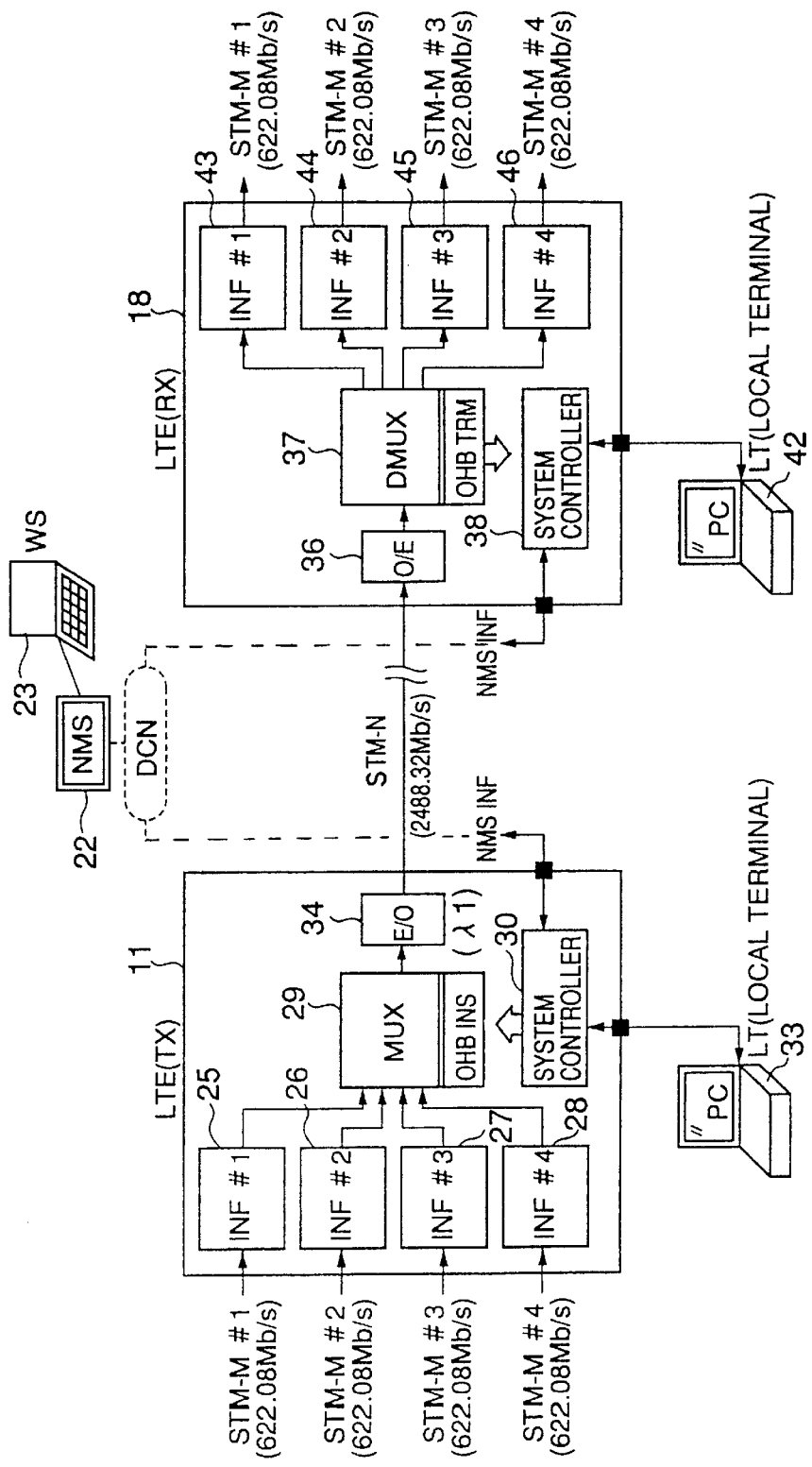
FIG. 2 is a block diagram of line terminal equipment shown in FIG. 1.
Figure 4:
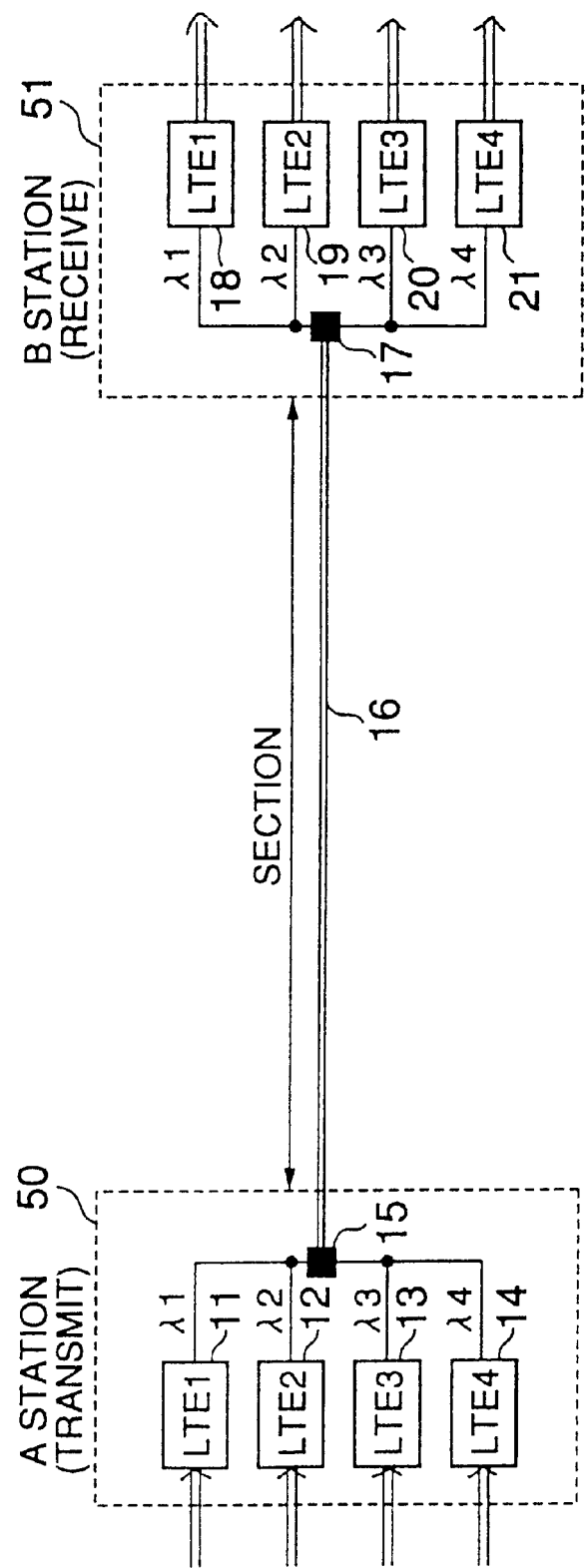
FIG. 4 is a diagram showing a section trace function.

The elecro-optic converter 70 converts the supplied high-bit-rate data signal into an optical signal STM-N. Although not illustrated in FIG. 5, the optical signal STM-N output by the electro-optic converter 70 is supplied to the optical coupler 15 shown in FIG. 1, which coupler multiplexes other optical signals generated similarly. Then, the multiplexed optical signal is output from the optical coupler 15 to the optical coupler 17 via the optical fiber cable 16.

An opto-electric (O/E) converter 72 receives the multiplexed optical signal from the optical fiber cable 16. The converter 72 converts the received optical signal into a corresponding electric signal, which is supplied to a demultiplexer (DMUX) 73. The demultiplexer 73 demultiplexes the received signal into the data signals STM-M#1–STM-M#4 and the OHB data. The data signals STM-M#1–STM-M#4 are respectively supplied to devices of the next stage via interface parts 78–81. The OHB data is supplied to a system controller 74, which performs various controls in accordance with instructions supplied from a local terminal 77.

The system controller 74 detects the encoded wavelength value data from the supplied OHB data, and supplies it to a reception-side wavelength monitor part 75 and a wavelength value expected value check part 76. The parts 75 and 76 subject the encoded wavelength data to a process reverse to that of the transmission-side line terminal equipment 61, so that the wavelength value data is reproduced.

The reception-side wavelength value monitor part 75 notifies the local terminal 77 of the wavelength value data. The wavelength value expected value check part 76 compares expected values of the wavelength value data of the received signals prepared in the local terminal 77 beforehand with the notified wavelength value data, and determines whether the target signals are duly connected.

The system controller 74 is notified of the result of the above determination from the check part 76. If it is determined that the target signals are not duly connected, the system controller 74 performs an abnormality procedure by which a given alarm process and a transfer of an alarm to the outside of the line terminal equipment 71 are performed.

The above-mentioned embodiment has the transmission-side wavelength data setting part 68, the reception-side wavelength value monitor part 75 and the wavelength value expected value check part 76 separately from the system controllers 67 and 74. Alternatively, the embodiment may be modified so that the system controller 67 and 74 perform the processes of the transmission-side wavelength data setting part 68, the reception-side wavelength value monitor part 75 and the wavelength value expected value check part 76.

According to the present invention, it is possible to check the connection between the line terminal equipment and the optical fiber by comparing, in the wavelength value expected value check part 76, the expected values of the wavelength value data with the wavelength value data transferred and extracted on the receive side.

The reception-side wavelength value monitor part 75 is capable of notifying an external device such as the local terminal 77 of the reproduced wavelength value data. Hence, the work of installing and extending channels and optical fiber lines can be facilitated.

It is possible to easily process and manage the information by transferring the OHB data including the wavelength value data separate from the OHB data including the section trace (J0 byte). This is advantageous to a network in which a wavelength division multiplexing transmission system and a single-wavelength transmission system coexist. In such a network, the section information common to both the systems is transferred by the section trace, while the wavelength information required for only the wavelength division multiplexing transmission system is transferred by the separate OHB data. If there is no need for the wavelength information, a wavelength undefined code may be inserted into the OHB data.

In practice, the section trace (J0 byte) is expressed in different fashions. For example, different carriers used in different countries or companies express the section trace in different fashions. In contrast, the use of the undefined bytes for transferring the wavelength value data makes it easy to cope with an increase in the number of wavelengths to be multiplexed and the number of optical fiber cables.

If a future technical advance makes it possible to replace an optical coupler by an electronic device, the target wavelength can easily be selected by using the wavelength value data used in the present invention, so that there is no need to change the connections of optical fiber cables.

It is possible to provide a transmission device includes the configurations of the line terminal equipment 61 and the line terminal equipment 71.

The present invention includes another embodiment in which only the wavelength of a signal in the wavelength division multiplexing transmission device is converted into another wavelength. In this case, the wavelength data information concerning the converted wavelength is inserted into or added to the signal.

The present invention is not limited to the specifically disclosed embodiments, and variations and modifications may be made without departing from the scope of the present invention.

The present application is based on Japanese priority application no. 10-206780 filed on Jul. 22, 1998, the entire contents of which are hereby incorporated by reference.

What is claimed is:

1. A wavelength division multiplexing transmission device comprising:
   a multiplexer part multiplexing a plurality of first signals having a first bit rate and different wavelengths into a second signal having a second bit rate higher than the first bit rate and inserting wavelength data information concerning the different wavelengths into the second signal; and
   a transmitting part transmitting an output of said multiplexer part to a transmission line in a form adapted to the transmission line.

2. The wavelength division multiplexing transmission device as claimed in claim 1, wherein the multiplexer part inserts the wavelength data information into an undefined area of the second signal.

3. The wavelength division multiplexing transmission device as claimed in claim 1, wherein the wavelength data information includes a plurality of digits which represent lower numeral numbers of the wavelengths.

4. The wavelength division multiplexing transmission device as claimed in claim 3, wherein each of the plurality of digits is binary data.

5. The wavelength division multiplexing transmission device as claimed in claim 1, wherein the multiplexer part inserts the wavelength data information into an undefined area of an overhead data area of the second signal.

6. The wavelength division multiplexing transmission device as claimed in claim 1, wherein said transmitting part comprises an electro-optic converter which converts the second signal into a corresponding optical signal.

7. A wavelength division multiplexing transmission device comprising:
   a plurality of multiplexer parts, each of which multiplexes a plurality of first signals having a first bit rate and different wavelengths into a second signal having a second bit rate higher than the first bit rate and inserts wavelength data information concerning the different wavelengths into the second signal; and
   an optical coupler which combines second signals from the plurality of multiplexer parts and outputs a resultant optical signal.

8. The wavelength division multiplexing transmission device as claimed in claim 7, wherein the multiplexer part inserts the wavelength data information into an undefined area of the second signal.

9. A wavelength division multiplexing transmission device comprising:
   a receiving part receiving a second signal having a second bit rate from a transmission line; and
   a demultiplexer part demultiplexing the second signal into first signals having a first bit rate lower than the second bit rate and having different wavelengths, and wavelength value data concerning the different wavelengths.

10. The wavelength division multiplexing transmission device as claimed in claim 9, wherein the demultiplexer part drops the wavelength data information from an undefined area of the second signal.

11. The wavelength division multiplexing transmission device as claimed in claim 9, wherein the wavelength data information includes a plurality of digits which represent lower numeral numbers of the wavelengths.

12. The wavelength division multiplexing transmission device as claimed in claim 11, wherein each of the plurality of digits is binary data.

13. The wavelength division multiplexing transmission device as claimed in claim 9, wherein the demultiplexer part drops the wavelength data information from an undefined area of an overhead data area of the second signal.

14. The wavelength division multiplexing transmission device as claimed in claim 9, wherein said receiving part comprises an opto-electric converter which converts the second signal into a corresponding electric signal.

15. A wavelength division multiplexing transmission device comprising:
   an optical coupler which separates an optical signal transferred over an optical fiber cable into second signals; and a plurality of demultiplexer parts, each of which demultiplexes one of the second signals having a second bit rate into first signals having a first bit rate lower than the second bit rate and having different wavelengths and wavelength value data concerning the different wavelengths.

16. The wavelength division multiplexing transmission device as claimed in claim 15, wherein each of the multiplexer parts drops the wavelength data information from an undefined area of the corresponding one of the second signals.

17. A wavelength division multiplexing transmission system comprising:

a first wavelength division multiplexing transmission device;

a second wavelength division multiplexing transmission device; and an optical fiber cable, the first wavelength division multiplexing transmission device comprising:

a multiplexer part which multiplexes a plurality of first signals having a first bit rate and different wavelengths into a second signal having a second bit rate higher than the first bit rate and inserts wavelength data information concerning the different wavelengths into the second signal; and an electro-optical converter which converts the second signal into an optical signal, the second wavelength division multiplexing transmission device comprising:

an opto-electric converter which converts the optical signal into the second signal; and a demultiplexer part which demultiplexes the second signal into the first signals and the wavelength value data.

18. A wavelength division multiplexing transmission system comprising:

a first wavelength division multiplexing transmission device;

a second wavelength division multiplexing transmission device; and an optical fiber cable, the first wavelength division multiplexing transmission device comprising:

a plurality of multiplexer parts, each of which multiplexes a plurality of first signals having a first bit rate and different wavelengths into a second signal having a second bit rate higher than the first bit rate and inserts wavelength data information concerning the different wavelengths into the second signal;

an electro-optical converter which converts the second signal into an optical signal; and a first optical coupler which combine optical signals from the plurality of multiplexers into a multiplexed optical signal transferred over the optical fiber cable, the second wavelength division multiplexing transmission device comprising:

a second optical coupler which separates the multiplexed optical signals into the optical signals;

opto-electric converters which convert the optical signals into the second signals; and demultiplexer parts which demultiplex the second signals into the first signals and the wavelength value data.

19. A wavelength division multiplexing transmission method comprising the steps of:

multiplexing a plurality of first signals having a first bit rate and different wavelengths into a second signal having a second bit rate higher than the first bit rate; and inserting wavelength data information concerning the different wavelengths into the second signal.

20. A wavelength division multiplexing transmission method comprising the steps of:

receiving a second signal; and demultiplexing a second signal having a second bit rate into first signals having a first bit rate lower than the second bit rate and having different wavelengths and wavelength value data concerning the different wavelengths.

21. A wavelength division multiplexing transmission device comprising:

a multiplexer part converting a wavelength of a signal into another wavelength and inserting wavelength data information concerning said another wavelength into said signal of said another wavelength; and a transmitting part transmitting an output of said multiplexer part to a transmission line in a form adapted to the transmission line.

22. A wavelength division multiplexing transmission device, comprising:

a multiplexer multiplexing a plurality of first signals having different wavelengths into a second signal; and a setting unit encoding wavelength information about the different wavelengths into unused areas of overhead data, the multiplexer inserting the overhead data containing the wavelength information into the second signal and outputting the second signal.

* * * * *